US012657746B2

(12) United States Patent
Iwao et al.

(10) Patent No.: US 12,657,746 B2
(45) Date of Patent: Jun. 16, 2026

(54) INFORMATION PROCESSING METHOD, INFORMATION PROCESSING DEVICE, AND RECORDING MEDIUM

(71) Applicant: NATIONAL INSTITUTES FOR QUANTUM SCIENCE AND TECHNOLOGY, Chiba (JP)

(72) Inventors: Yuma Iwao, Chiba (JP); Hideaki Tashima, Chiba (JP); Taiga Yamaya, Chiba (JP)

(73) Assignee: NATIONAL INSTITUTES FOR QUANTUM SCIENCE AND TECHNOLOGY, Chiba (JP)

( * ) Notice: Subject to any disclaimer, the term of this patent is extended or adjusted under 35 U.S.C. 154(b) by 217 days.

(21) Appl. No.: 18/728,961

(22) PCT Filed: Dec. 28, 2022

(86) PCT No.: PCT/JP2022/048594
§ 371 (c)(1),
(2) Date: Jul. 15, 2024

(87) PCT Pub. No.: WO2023/136173
PCT Pub. Date: Jul. 20, 2023

(65) Prior Publication Data
US 2025/0095170 A1     Mar. 20, 2025

(30) Foreign Application Priority Data

Jan. 17, 2022     (JP) ................................. 2022-005333

(51) Int. Cl.
*G06T 7/33* (2017.01)
*G06T 7/246* (2017.01)

(52) U.S. Cl.
CPC .............. *G06T 7/344* (2017.01); *G06T 7/251* (2017.01); *G06T 2207/10104* (2013.01)

(58) Field of Classification Search
None
See application file for complete search history.

(56) References Cited

U.S. PATENT DOCUMENTS 7,613,501 B2 * 11/2009 Scherch ................... A61B 6/08
378/65
2019/0234746 A1 * 8/2019 Zhang ....................... G06T 7/73
(Continued)

FOREIGN PATENT DOCUMENTS

JP           2012045318 A      3/2012
JP           2015034779 A      2/2015

OTHER PUBLICATIONS

Carson, Richard E., et al; "Design of a Motion-Compensation OSEM List-mode Algorithm for Resolution-Recovery Reconstruction for the HRRT", 2004 IEEE, p. 3281-3285, published 2004, 5 pages.

(Continued)

*Primary Examiner* — Edward Park
(74) *Attorney, Agent, or Firm* — NK Patent Law

(57) ABSTRACT

The relationship between coordinates associated with the distribution of radiation rays emitted from the inside of a physical object and coordinates associated with the outer shape of this physical object is easily derived. Based on first 3D data (Da) in which the distribution of radiation rays emitted from the inside of a physical object (subject P) is represented in first coordinates (Ca), second 3D data (Db) in which the inside and the outer shape of the physical object are represented in second coordinates (Cb), and third 3D data (Dc) in which at least a part of the outer shape of the physical object is represented in third coordinates (Cc), a relationship (R) between the first coordinates and the third coordinates is derived.

12 Claims, 7 Drawing Sheets

(56) References Cited

U.S. PATENT DOCUMENTS

| | | | |
|---|---|---|---|
| 2021/0042999 A1* | 2/2021 | Zhou | G06T 3/40 |
| 2021/0279942 A1* | 9/2021 | Petkov | G06T 15/80 |
| 2022/0133445 A1* | 5/2022 | Kucharczyk | A61C 9/006 |
| | | | 433/29 |
| 2025/0095170 A1* | 3/2025 | Iwao | G01T 1/161 |
| 2026/0057658 A1* | 2/2026 | Miraldo | G06T 15/20 |

OTHER PUBLICATIONS

Noonan, PJ, et al; "Repurposing the Microsoft Kinect for Windows v2 for external head motion tracking for brain PET", Phys. Med. Biol. Vol. 60, p. 8753-8766, published Nov. 3, 2015, 15 pages.

Oleson, Oline Vinter, et al; "Motion Tracking in Narrow Spaces: A Structured Light Approach", Springer-Verlag Berlin Heidelberg, p. 253-260, published 2010, 8 pages.

Iwao, Yuma, et al; "Seated versus supine: consideration of the optimum measurement posture for brain-dedicated PET", Phys. Med. Biol. vol. 64 125003, published Jun. 10, 2019, 14 pages.

Iwao, Yuma, et al; "Development of markerless and calibrationless body motion correction method for head PET", IQMS & NIQRST, PowerPoint presentation, published Dec. 11, 2021, 84 pages.

Iwao, Yuma, et al; "Marker-less and calibration-less motion correction method for brain Pet", IQMS & NIQRST, published Nov. 18, 2021, 19 pages.

Iwao, Yuma, et al; "Development of a Completely Markerless Head PET Body Movement Measurement and Correction Method", IQMS & NIQRST & ATOX Corp., PowerPoint presentation, published Nov. 4, 2021, 52 pages.

Iwao, Yuma, et al; "Development of a Completely Markerless Head PET Body Movement Measurement and Correction Method", IQMS & NIQRST, published Nov. 4, 2021, 2 pages.

Iwao, Yuma, et al; "A marker-less motion correction method for brain dedicated PET", QST, M-06, MIC-Poster II, PowerPoint presentation, published Oct. 21, 2021, 1 pages.

Iwao, Yuma, et al; "A marker-less motion correction method for brain dedicated PET", Abstract, published Oct. 18, 2021, 1 page.

Iwao, Yuma, et al; "A marker-less motion correction method for brain dedicated PET", Member, IEEE, QST, published Sep. 10, 2021, 2 pages.

Iwao, Yuma, et al; "Development of a Markerless Body Movement Correction Method for Head PET", NIRS & QST, published Mar. 17, 2021, 54 pages.

Bloomfiel, Peter M., et al; "The design and implementation of a motion correction scheme for neurological PET", Institute of Psychics Publishing, Phys. Med. Biol. vol. 48, pp. 959-978, published Apr. 1, 2003, 21 pages.

Iwao, Yuma, et al; "Development of a Markerless Body Movement Correction Method for Head PET", IEICE Technical Report, vol. 120, No. 431, p. 198-202, published Mar. 2021, 5 pages.

Iwao, Yuma; "Motion correction method for brain PET", 2020 Report on PET Imaging Physics Research, p. 55-58, published Jan. 23, 2021, 4 pages.

ISA/JP; International Search Report for International Patent Application No. PCT/JP2022/048594, mailed Feb. 28, 2023, 4 pages.

ISA/JP; Written Opinion for International Patent Application No. PCT/JP2022/048594, mailed Feb. 28, 2023, 6 pages.

* cited by examiner

FIG. 3

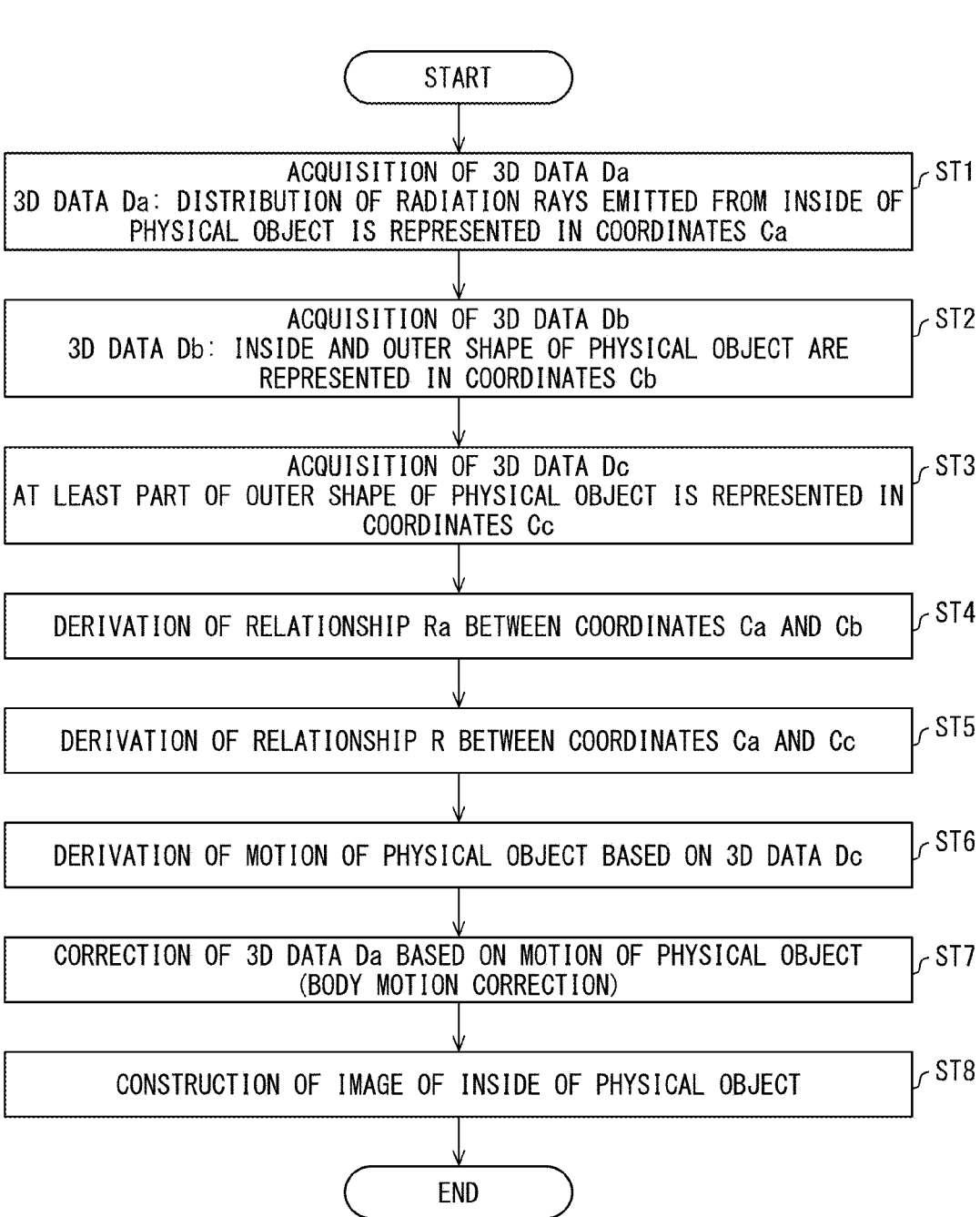

START

ACQUISITION OF 3D DATA Da
3D DATA Da: DISTRIBUTION OF RADIATION RAYS EMITTED FROM INSIDE OF PHYSICAL OBJECT IS REPRESENTED IN COORDINATES Ca — ST1

ACQUISITION OF 3D DATA Db
3D DATA Db: INSIDE AND OUTER SHAPE OF PHYSICAL OBJECT ARE REPRESENTED IN COORDINATES Cb — ST2

ACQUISITION OF 3D DATA Dc
AT LEAST PART OF OUTER SHAPE OF PHYSICAL OBJECT IS REPRESENTED IN COORDINATES Cc — ST3

DERIVATION OF RELATIONSHIP Ra BETWEEN COORDINATES Ca AND Cb — ST4

DERIVATION OF RELATIONSHIP R BETWEEN COORDINATES Ca AND Cc — ST5

DERIVATION OF MOTION OF PHYSICAL OBJECT BASED ON 3D DATA Dc — ST6

CORRECTION OF 3D DATA Da BASED ON MOTION OF PHYSICAL OBJECT (BODY MOTION CORRECTION) — ST7

CONSTRUCTION OF IMAGE OF INSIDE OF PHYSICAL OBJECT — ST8

END

INFORMATION PROCESSING METHOD, INFORMATION PROCESSING DEVICE, AND RECORDING MEDIUM

CROSS-REFERENCE TO RELATED APPLICATIONS

This application is a U.S. National Stage Application of International Patent Application No. PCT/JP2022/048594, filed on Dec. 28, 2022, which claims priority to Japanese Patent Application No. 2022-005333, filed on Jan. 17, 2022, the entire contents of which are incorporated by reference herein.

TECHNICAL FIELD

The present invention relates to an information processing method, an information processing device, and a recording medium.

BACKGROUND ART

Positron-emission tomography (PET) is known for capturing an image of the inside of the body of a subject with use of a radionuclide which emits positrons. In PET, the inside of the body of the subject is imaged by measuring radiation rays emitted from a medical agent (containing a radionuclide) distributed in an internal organ, etc. of a subject. The PET measurement requires approximately several minutes to several tens of minutes, during which a subject is kept immobile. Therefore, there is demand for making it possible to conduct the measurement with a subject allowed to move, to lighten a burden on the subject.

As an attempt to meet the demand, a method of measuring the motion of a subject via an optical measuring device while measuring the subject via a PET device (see, for example, Non-Patent Literature 1) is known. By using the measured motion of a patient, the result of the measurement conducted via PET is corrected (body motion correction). This makes it possible to obtain a clear image even in a case of conducting a measurement with a subject in motion.

CITATION LIST

Non-Patent Literature

[Non-patent Literature 1]
Bloomfield P M, Spinks T J, Reed J, Schnorr L, Westrip A M, Livieratos L, Fulton R and Jones T 2003 The design and implementation of a motion correction scheme for neurological PET Phys. Med. Biol. 48 pp 959-78.

SUMMARY OF INVENTION

Technical Problem

In order to make a body motion correction, it is necessary to determine a position relationship between a PET device and an optical measuring device. In a case where this position relationship is unclear, it is difficult to reflect, into the result of the measurement conducted via the PET device, the motion of the subject measured via the optical measuring device.

A possible solution to this is to constantly keep the PET device and the optical measuring device in a fixed position relationship. However, constantly this fixed position relationship to tends restrict the flexibility of the measurement conducted via the PET device. Meanwhile, a variable position relationship makes it difficult to maintain the identicalness of the position relationship during the measurement.

It is not always easy to determine the position relationship between a PET device and an optical measuring device while ensuring the flexibility of the measurement conducted via the PET device.

An object of the present invention is to provide an information processing method, an information processing device, and a recording medium which make it possible to easily derive a relationship between three-dimensional coordinates associated with the distribution of radiation rays emitted from the inside of a physical object and three-dimensional coordinates associated with the outer shape of this physical object.

Solution to Problem

In order for the above problem to be solved, an information processing method in accordance with an embodiment of the present invention includes the steps of: acquiring first 3D data in which a distribution of radiation rays emitted from an inside of a physical object is represented in first three-dimensional coordinates; acquiring second 3D data in which the inside and an outer shape of the physical object are represented in second three-dimensional coordinates; acquiring third 3D data in which at least a part of the outer shape of the physical object is represented in third three-dimensional coordinates; and deriving a relationship between the first three-dimensional coordinates and the third three-dimensional coordinates, based on the first 3D data, the second 3D data, and the third 3D data.

Advantageous Effects of Invention

According to an embodiment of the present invention, it is possible to provide an information processing method, an information processing device, and a recording medium which make it possible to easily derive the relationship between first three-dimensional coordinates associated with the distribution of radiation rays emitted from the inside of a physical object and third three-dimensional coordinates associated with the outer shape of the physical object, with use of second 3D data in which the inside and the outer shape of the physical object are represented in second three-dimensional coordinates.

BRIEF DESCRIPTION OF DRAWINGS

FIG. 3 is a flowchart representing an operation procedure of the information processing device in accordance with an embodiment of the present invention.

DESCRIPTION OF EMBODIMENTS

Configuration of Information Processing Device

Figure 1:
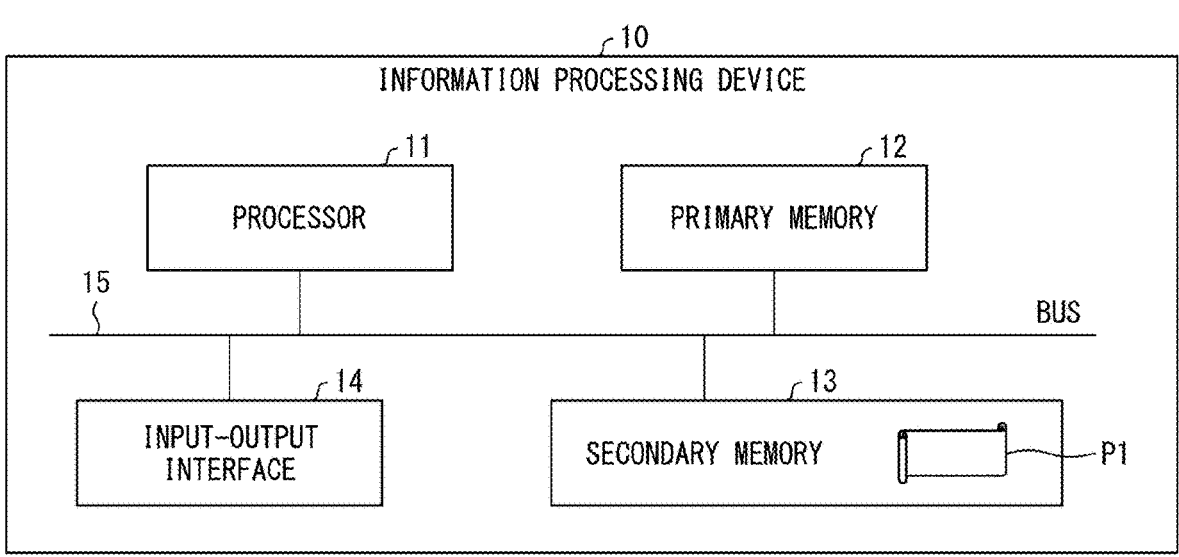
FIG. 1 is a block diagram representing a configuration of an information processing device in accordance with an embodiment of the present invention.

A configuration of an information processing device 10 will be described below with reference to FIG. 1. FIG. 1 is a block diagram representing a configuration of the information processing device 10 in accordance with an embodiment of the present invention.

The information processing device 10 is provided with use of a general-purpose computer, and includes a processor 11, a primary memory 12, a secondary memory 13, an input-output interface 14, and a bus 15, as illustrated in FIG. 1. The processor 11, the primary memory 12, the secondary memory 13, and the input-output interface 14 are connected together via the bus 15.

The secondary memory 13 has an information processing program P1 stored (stored in a nonvolatile manner) therein. The processor 11 loads the information processing program P1 stored in the secondary memory 13 into the primary memory 12. The processor 11 then carries out the steps of an information processing method (described later) in accordance with the instructions contained in the information processing program P1 loaded in the primary memory 12.

To the input-output interface 14, an input device and/or an output device is/are connected. Examples of the input device connected to the input-output interface 14 include measurement devices Aa, Ab, and Ac (described later). The measurement devices Aa, Ab, and Ac are used for inputting 3D data Da, 3D data Db, and 3D data Dc (described later), respectively. Examples of the output device connected to the input-output interface 14 include a display. The display is used for outputting an image (described later).

Examples of a device which can be used as the processor 11 can include a central processing unit (CPU). Examples of a device which can be used as the primary memory 12 can include a random access memory (RAM). Examples of a device which can be used as the secondary memory 13 can include a hard disk drive (HDD). Examples of the input-output interface 14 can include a peripheral component interconnect (PCI) interface.

Figure 2:
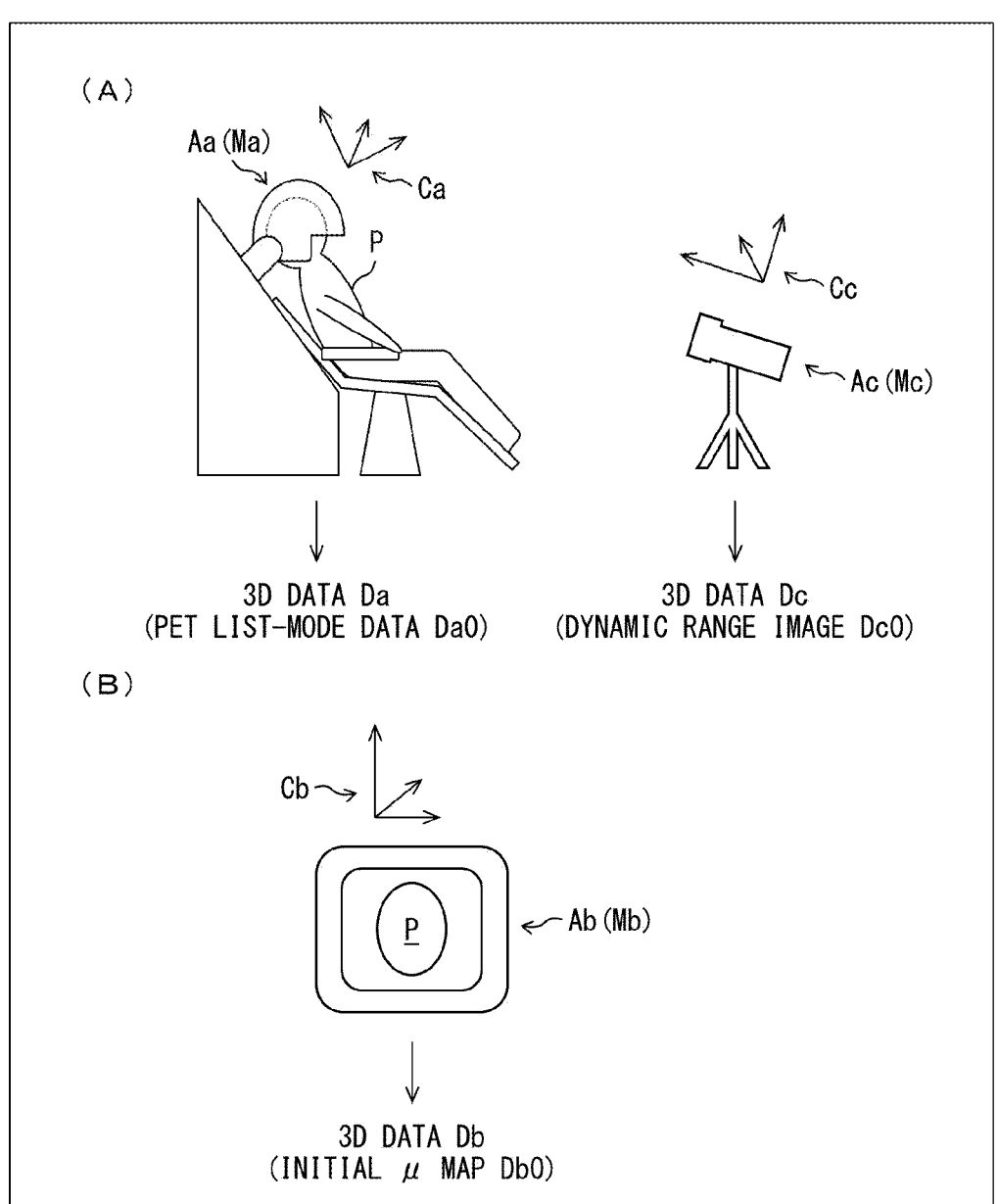
FIG. 2 is a schematic view representing outline configurations of measurement devices in accordance with an embodiment of the present invention.

FIG. 2 is a schematic view representing outline configurations of the measurement devices Aa to Ac in accordance with an embodiment of the present invention. (A) of FIG. 2 represents a state in which a subject (physical object) P is being measured via the measurement devices Aa and Ac. (B) of FIG. 2 represents a state in which the subject (physical object) P is being measured via the measurement device Ab. That is, the measurement via the measurement device Ab here is conducted separately from the measurement conducted via the measurement devices Aa and Ac.

The measurement device Aa (first measurement device) has measurement equipment Ma (first measurement equipment) for detecting radiation rays emitted from the inside of the subject (physical object) P, and generates 3D data Da (first 3D data) which represents the distribution of the radiation rays emitted from the inside of the subject P. The 3D data Da is represented in three-dimensional coordinates Ca (first three-dimensional coordinates) given with the measurement equipment Ma used as a reference. The measurement device Aa here is a PET device for detecting annihilation radiation emitted from the inside of the subject P, and the 3D data Da is PET list-mode data Da0. Note that the measurement device Aa is not limited to a PET device.

The measurement equipment Ma here has the shape of a helmet which covers the head of the subject P, and detects annihilation radiation emitted from the inside of the head of the subject P. Note that the measurement device Aa may be a device which measures a part other than the head of the subject P, or the entire body of the subject P.

The measurement device Ab (second measurement device) has measurement equipment Mb (second measurement equipment) which includes an irradiator for applying radiation rays, electromagnetic waves, or ultrasonic waves to the subject (physical object) P and a detector for detecting the radiation rays, the electromagnetic waves, or the ultrasonic waves having passed through the inside of the subject P, and generates 3D data Db (second 3D data) which represents the inside and the outer shape of the subject P. The 3D data Db is represented in three-dimensional coordinates Cb (second three-dimensional coordinates) given with the measurement equipment Mb used as a reference.

The measurement device Ab here is an X-ray CT device which applies X-rays to the subject P, and the 3D data Db is an initial μ map Db0. The initial μ map Db0 can be used for absorption correction to the PET list-mode data Da0, as will be described later. Note that the measurement device Ab is not limited to an X-ray CT device. The measurement device Ab may be, for example, an MRI device.

In this embodiment, since the measurement device Aa measures the inside of the head of the subject P, the measurement device Ab only needs to measure the head of the subject P. However, a part containing the head of the subject P, which is, for example, the entire body of the subject P, may be measured.

The measurement device Ac (third measurement device) has measurement equipment t Mc (third measurement equipment) which includes an irradiator for applying electromagnetic waves or ultrasonic waves to the subject (physical object) P and a detector detecting the electromagnetic waves or the ultrasonic having been reflected by the subject P, and generates 3D data Dc (third 3D data) which represents at least a part of the outer shape of the subject P. The at least a part of the outer shape of the subject P is, for example, the face of the subject P. The 3D data Dc is represented in three-dimensional coordinates Cc (third three-dimensional coordinates) given with the measurement equipment Mc used as a reference.

The measurement device Ac here is an optical measuring device for applying infrared rays to the subject P, and is, more specifically, an external range sensor, and the 3D data Dc is a dynamic range image Dc0 of the external range sensor. Note that the measurement device Ac is not limited to an optical measuring device.

In this embodiment, since the measurement device Aa measures the inside of the head of the subject P, the measurement device Ac only needs to measure a portion (e.g. face) of the head of the subject P. However, a part containing the head of the subject P, which is, for example, the entire body of the subject P, may be measured.

As an example, the measurement devices Aa to Ac here measure the subject P with the measurement centering on the head of the subject P. However, the subject (physical object) of the measurement conducted via the measurement devices Aa to Ac is not limited to the head of a human. The subject of the measurement may be a part other than the face, or the entire body of a human. Alternatively, the subject of the measurement may be an animal (living thing) other than a human.

As described above, the measurement devices Aa and Ac here measure the subject P in parallel (substantially concurrently) with each other, whereas the measurement device Ab measures the subject P separately from (at a time and a place different from those of) the measurement devices Aa and Ac. However, the measurement devices Aa, Ab, and Ac may measure the subject P in parallel (substantially concurrently) with each other.

Information Processing Method

Figure 4:
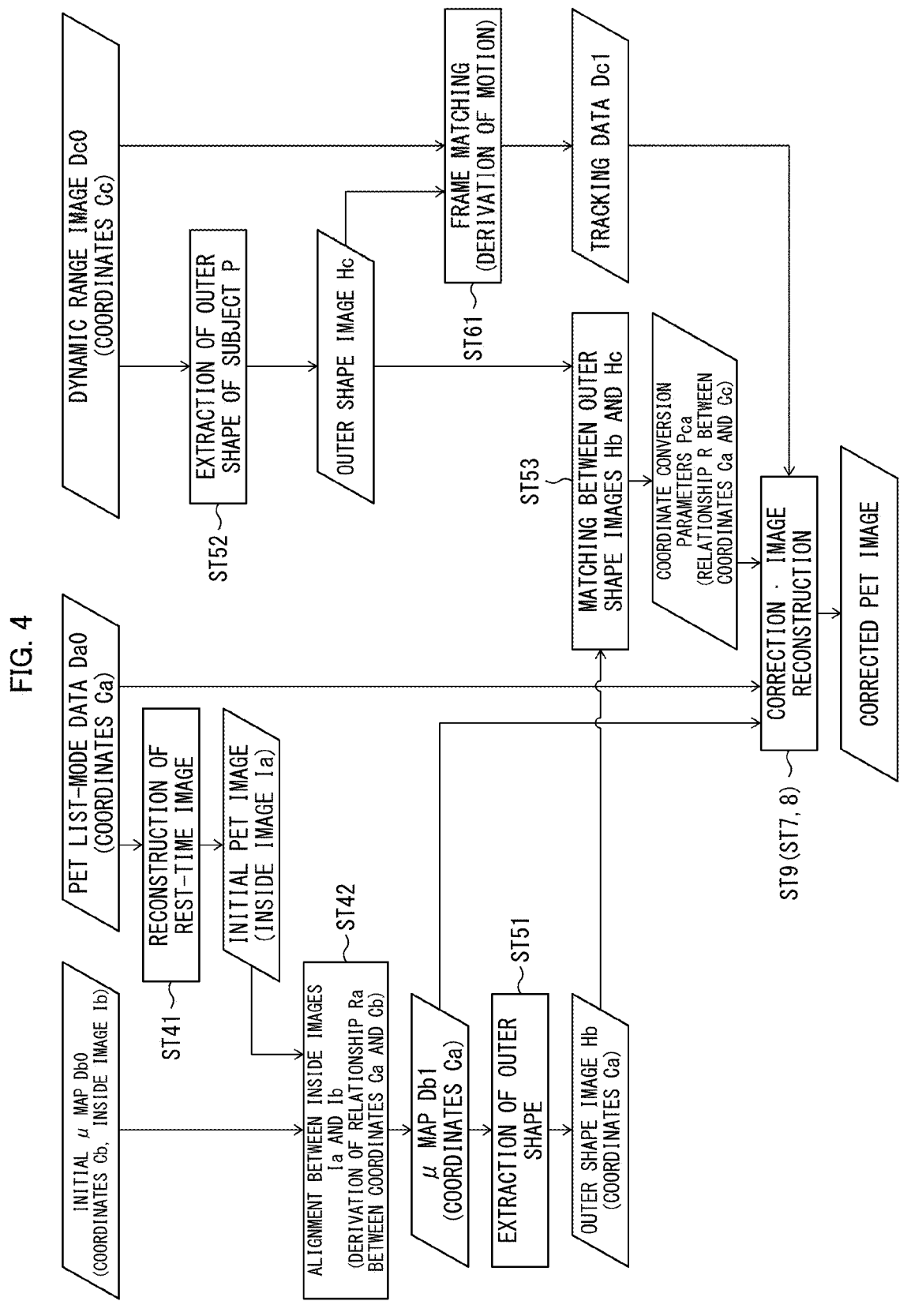
FIG. 4 is a flowchart representing the details of the operation procedure of the information processing device in accordance with an embodiment of the present invention.
Figure 5:
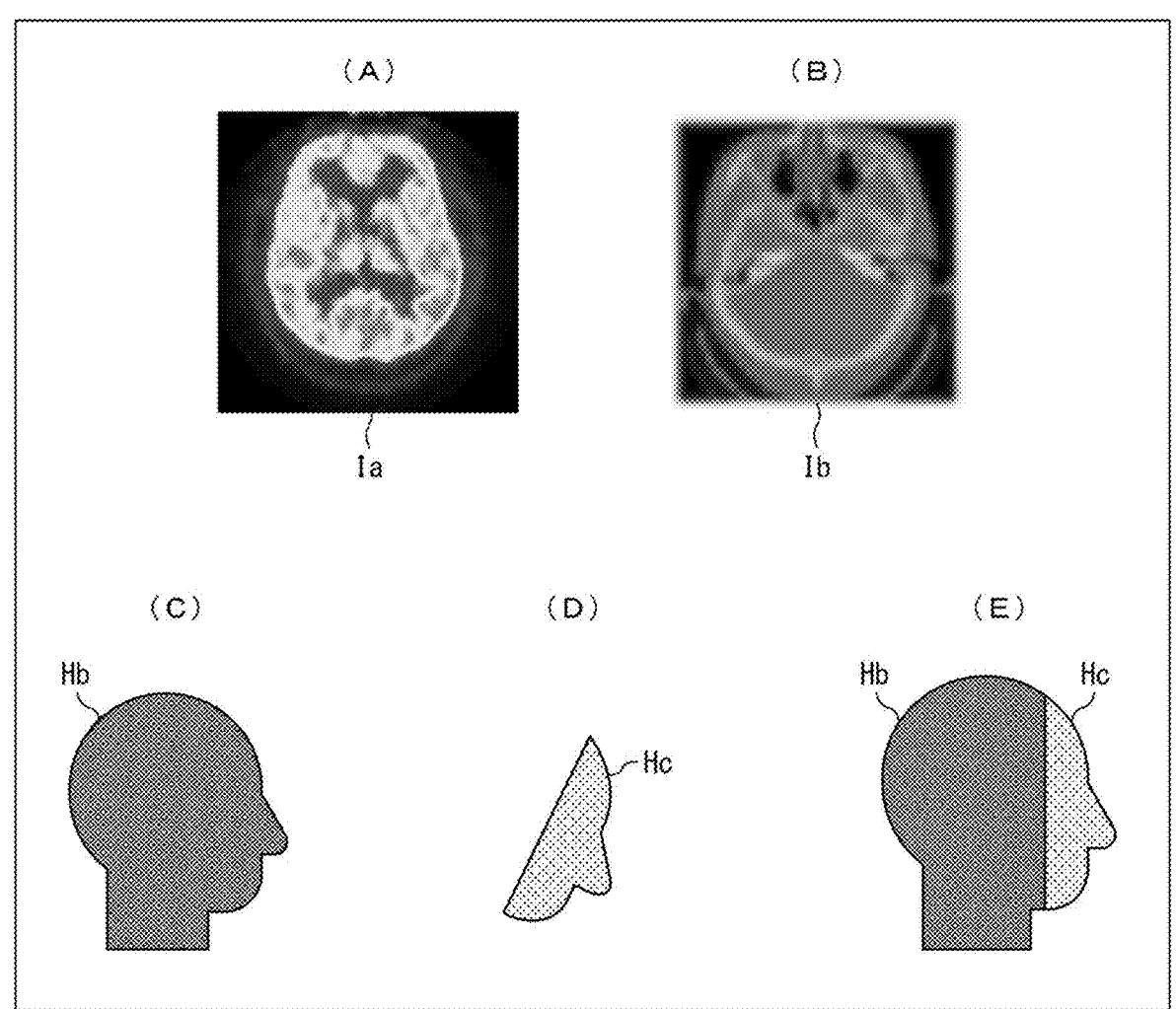
FIG. 5 is a representation of the inside and the outer shape of a physical object.

FIG. 3 is a flowchart representing an operation procedure of the information processing device in accordance with an embodiment of the present invention. FIG. 4 is a flowchart representing an example of the details of the operation procedure of the information processing device in accordance with an embodiment of the present invention. FIG. 5 is a representation of the inside and the outer shape of a physical object (subject P). The details of the information processing method carried out by the information processing device 10 will be described below on the basis of FIGS. 3, 4, and 5.

Acquisition of 3D Data Da, Db, Dc

The information processing device 10 acquires the 3D data Da to Dc (steps ST1 to ST3). As already described, the 3D data Da to Dc is generated by the measurement devices Aa to Ac, and the information processing device 10 receives the 3D data Da to Dc from the measurement devices Aa to Ac.

Derivation of Relationship R Between Coordinates Ca and Cc from 3D Data Da, Db, Dc A relationship R between the coordinates Ca and Cc is derived by the procedure as described below.

Based on the 3D data Da and Db, a relationship Ra between the coordinates Ca and Cb is derived (step ST4). More specifically, steps of FIG. 4 which are ST41 (reconstruction of a rest-time image) and ST42 (alignment between inside images Ia and Ib) are carried out in sequence, as described next.

First, the inside image Ia (first inside image, which is specifically an initial PET image) of the subject P at the time when the subject P is substantially at rest is reconstructed from the PET list-mode data Da0 (step ST41). That is, from the PET list-mode data Da0, PET list-mode data Da0 (fifth 3D data) that corresponds to the time zone in which the subject P is substantially at rest is extracted, and the inside image Ia is reconstructed (see (A) of FIG. 5). The inside image Ia here represents the inside of the head of the subject P.

Whether the subject P is substantially at rest can be determined based on the PET list-mode data Da0 and the dynamic range image Dc0. For example, in a case where there is a time zone in which the image represented by the dynamic range image Dc0 remains substantially unchanged, it can be said that the subject P is substantially at rest in the time zone.

With respect to the reconstruction of the inside image Ia from the extracted PET list-mode data Da0, an absorption correction (a correction to reduce the measurement error caused by absorption of radiation rays inside the subject P)

does not need to be carried out. It is possible to use the inside image Ia (initial PET image) generated without carrying out an absorption correction, to align the inside image Ia with the inside image Ib represented by the initial $\mu$ map Db0.

An absorption correction may be carried out. In this stage, the relationship Ra between the coordinates Cb and Ca is unclear between the initial $\mu$ map Db0 and the PET list-mode data Da0, and it is therefore impossible to use the initial $\mu$ map Db0 to carry out an absorption correction to the PET list-mode data Da0. However, an absorption correction may be carried out with use of another $\mu$ map or the like so that the inside image Ia which is clearer is generated.

Next, as a result of bringing the inside image Ia (first inside image) based on the PET list-mode data Da0 and the inside image Ib (second inside image) based on the initial $\mu$ map Db0 into alignment with each other, the relationship Ra between the coordinates Ca and Cb is derived (step ST42, see (B) of FIG. 5). The inside image Ib here represents the inside of the head of the subject P.

In the alignment between the inside image Ia and the inside image Ib, for example, the coordinates Ca and the coordinates Cb are subjected to a relative displacement such that the inside image Ia and the inside image Ib correspond (approximately coincide) with each other. The displacement of coordinates can include translation (x,y,z) and rotation $(\varphi,\theta,\Psi)$.

The relative displacement of the coordinates when the inside images Ia and 1b align with each other is an example of the relationship Ra between the coordinates Ca and Cb. The relationship Ra may be coordinate conversion parameters for finding a coordinate conversion between the coordinates Ca and Cb. The coordinate conversion parameters can be represented in, for example, a 4×4 matrix.

As a result of the alignment between the inside images Ia and 1b (step ST42), a $\mu$ map Db1 (fourth 3D data) in which the initial $\mu$ map Db0 is represented in the coordinates Ca is formed.

Based on the relationship Ra and 3D data Da and Dc, the relationship R between the coordinates Ca and Cc is derived (step ST5). More specifically, steps of FIG. 4 which are ST51 (extraction of the outer shape of the subject P from the u map Db1), ST52 (extraction of the outer shape of the subject P from the dynamic range image Dc0), and ST53 (matching between outer shape images Hb and Hc) are carried out in sequence, as described next.

First, the outer shape image Hb (first outer shape image) in which the outer shape of the subject P is represented in the coordinates Ca is extracted from the $\mu$ map Db1 (step ST51, (C) of FIG. 5). The outer shape image Hb here represents the outer shape of the head of the subject P. This extraction can be carried out by, for example, appropriately setting a threshold for binarizing the $\mu$ map Db1. That is, the $\mu$ map Db1 is processed such that the contrast (edge) between the inside (the inside of a body) and the outside (the outside of a body) of the subject P is enhanced.

Next, the outer shape image Hc (second outer shape image) corresponding to the entire body or a part (the face of the head, here) of the body of the subject P at rest is extracted from the dynamic range image Dc0 (step ST52, (D) of FIG. 5).

This extraction process is carried out by the following procedure. First, from the dynamic range image Dc0, a dynamic range image Dc0 (sixth 3D data) that temporally corresponds to the PET list-mode data Da0 (on the subject P substantially at rest) extracted in step ST41 is extracted. Next, from the extracted dynamic range image Dc0, the outer shape image Hc (second outer shape image) corresponding to the entire body or a part (the face of the head, here) of the body of the subject P is extracted. This extraction can be carried out by, for example, designating an area corresponding to the face of the subject P in the dynamic range image Dc0.

Further, matching between the outer shape images Hb and Hc is carried out (step ST53, (E) of FIG. 5). This matching means finding a position relationship in which the outer shape images Hb and Hc correspond to each other. As a result, the outer shape image Hb representing the head of the subject P and the outer shape image Hc representing the face of the subject P are arranged so as to correspond to each other. As a result, a relationship (e.g. coordinate conversion parameters Pca which enable the coordinate conversion from the coordinates Cc into the coordinates Ca) between the coordinates Ca and Cc is derived.

Derivation of Motion of Subject P

Based on the dynamic range image Dc0, the motion of the subject (physical object) P is derived (step ST6).

In this embodiment, step ST61 (frame matching) of FIG. 4 is carried out, and matching between the dynamic range image Dc0 and the outer shape image Hc is carried out for each frame of the dynamic range image Dc0. That is, the outer shape image Hc is extracted from among the dynamic range image Dc0, and tracking data Dc1 which represents a temporal change in the position of the outer shape image Hc is generated, accordingly. The tracking data Dc1 represents the motion of the subject (physical object) P.

Body Motion Correction

Based on the motion of the subject (physical object) P, the 3D data Da is corrected (body motion correction, step ST7), and the image of the inside of the subject (physical object) P is reconstructed (step ST8). In FIG. 4, these steps are collectively described as step ST9 (correction·image reconstruction). This will be described in detail below.

Based on the motion of the subject (physical object) P represented by the tracking data Dc1, the PET list-mode data Da0 is corrected (body motion correction). The motion of the subject (physical object) P represented by the tracking data Dc1 is represented in the coordinates Cc. Because of this, the tracking data Dc1 is subjected to coordinate conversion in which the coordinate conversion parameters Pca are used, and the motion of the subject (physical object) P is thus represented in the coordinates Ca. Based on the motion of the subject (physical object) P represented in the coordinates Ca, the PET list-mode data Da0 is corrected and a corrected PET image is generated accordingly.

Typically, in addition to this body motion correction, an absorption correction is also carried out. In the absorption correction, the PET list-mode data Da0 is corrected based on the μ map Db1. In carrying out the absorption correction, the μ map Db1 used for the absorption correction also needs to be subjected to the body motion correction. Note that other corrections such as a sensitivity correction and a scatter correction may be additionally carried out. In this case, the parameters used for these corrections also need to be subjected to the body motion correction.

Main Points

As described above, according to the present embodiment, acquired are the 3D data Da in which the distribution of radiation rays emitted from the inside of the subject P is represented in coordinates Ca, the 3D data Db in which the inside and the outer shape of the subject P are represented in coordinates Cb, and 3D data Dc in which at least a part of the outer shape of the subject P is represented in coordinates Cc. It is possible to derive a relationship R between the coordinates Ca and Cc, based on the 3D data Da, Db, and Dc, to correct (body motion correction) the 3D data Da, based on the relationship R and the motion of the subject P represented by the 3D data Dc.

By using the 3D data Db as a reference for the coordinates Ca and Cc between the 3D data Da and 3D data Dc, it is possible to easily find the relationship R between the coordinates Ca and Cc. As a result, even when the position relationship between the measurement devices Aa and Ac is unclear, it is possible to correct the 3D data Da, based on the 3D data Dc.

In this derivation of the relationship R between the coordinates Ca and Cc, it is only required that it is possible to associate the inside and the outer shape of the subject P represented by the 3D data Db with the inside of the subject P represented by the 3D data Da and the outer shape of the subject P represented by the 3D data Dc. In other words, the inside and the outer shape of the subject P serve as the reference for coordinates. This makes it possible to generate 3D data Db separately from the 3D data Da and Dc. In addition, it does not matter to coordinates Ca, Cb, not to mention coordinates Cb, if the position, orientation, etc. of the subject P are not known.

Variation

Although the measurement devices Aa and Ab are separate devices in the above embodiment, the measurement devices Aa and Ab may be integrated into a single device. For example, a PET-CT device, into which a PET device and an X-ray CT device are integrated, can be used.

For the derivation of the relationship R between the coordinates Ca and Cc, various methods can be used. According to an embodiment, the relationship Ra between the coordinates Ca and Cb is derived based on the 3D data Da and Db, and the relationship R between the coordinates Ca and Cc is derived based on the relationship Ra and 3D data Db and Dc. Besides, the relationship R can be derived by the procedures (1) to (3) below.

(1) Derivation of the relationship Ra between the coordinates Ca and Cb, based on the 3D data Da and Db (2) Derivation of a relationship Rb between the coordinates Cb and Cc, based on the 3D data Db and Dc (3) Derivation of the relationship R between the coordinates Ca and Cc, based on the relationships Ra and Rb In conducting the above procedures, the order in which the relationships Ra and Rb are derived may be altered.

According to the embodiment described above, in deriving the relationship R based on the relationship Ra and the 3D data Db and Dc, μ map Db1 in which the initial μ map Db0 is represented in the coordinates Ca is generated, and an outer shape image Hb (first outer shape image) in which the outer shape of the subject P is represented in the coordinates Ca is extracted from the μ map Db1. This eliminates the need to consider the coordinates Cb in the process of matching between the outer shape images Hb and Hc and the subsequent processes.

Figure 6:
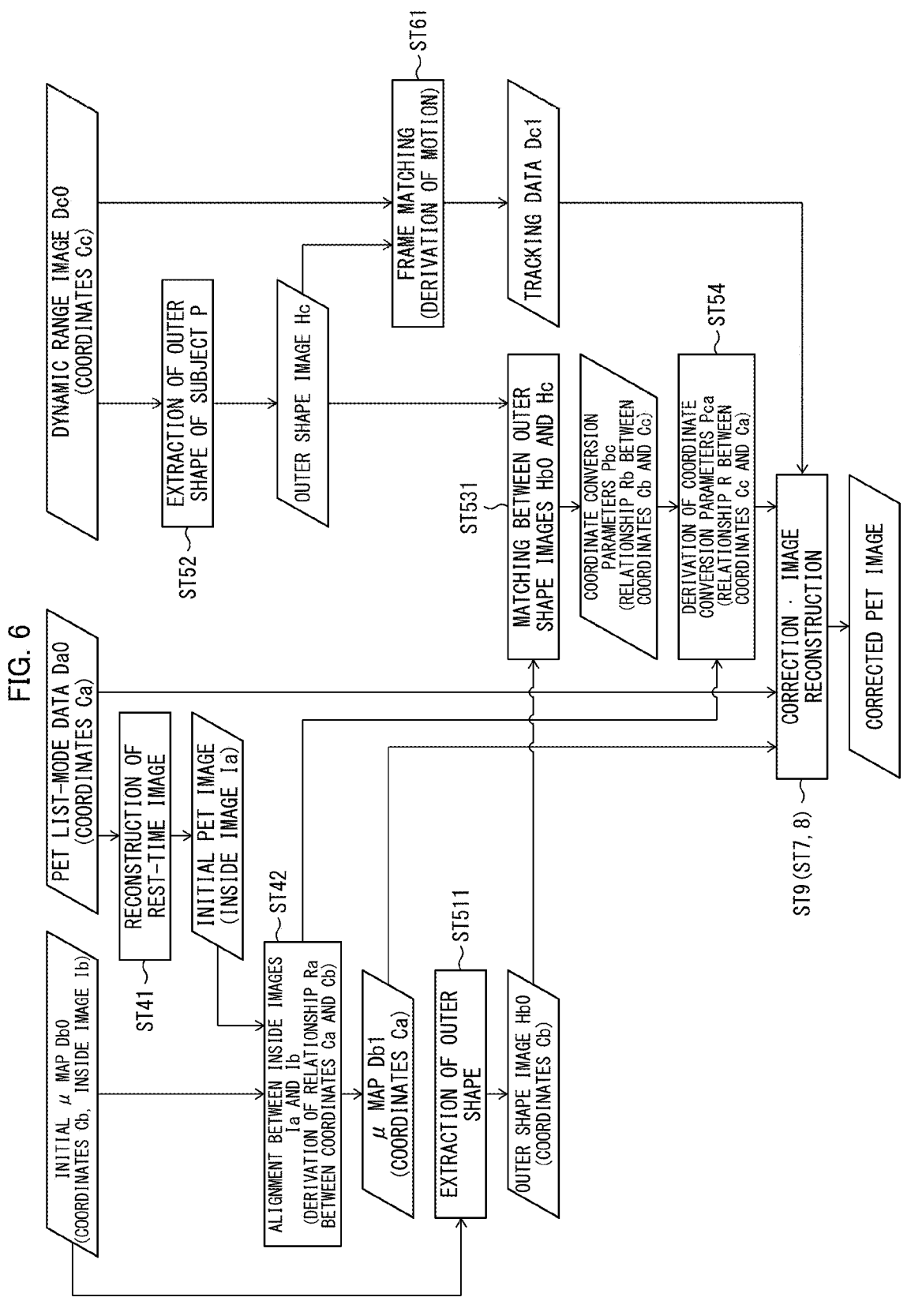
FIG. 6 is a flowchart representing the details of an operation procedure of an information processing device in accordance with Variation of the present invention.

Unlike this, the outer shape image Hb may be represented in the coordinates Cb. FIG. 6 is an example of the flowchart used in this case. A step the same as a step of FIG. 4 is assigned the same reference sign. A step ST54 is added to the steps of FIG. 4. For ease of understanding, the outer shape image Hb is changed to an outer shape image Hb0, and steps ST51 and ST53 are changed to steps ST511 and ST531.

The outer shape image Hb0 is represented in the coordinates Cb. In Variation, the outer shape image Hb0 (third outer shape image) in which the outer shape of the subject P is represented in the coordinates Cb is extracted from the initial μ map Db0 (step ST511). By carrying out matching between the outer shape images Hb0 and Hc (step ST531), the relationship Rb (coordinate conversion parameters Pbc) between the coordinates Cb and Cc is derived. The relationship R (coordinate conversion parameters Pca) between the coordinates Ca and Cc is then derived with use of the relationships Ra and Rb (step ST54).

EXAMPLE

An experiment was carried out with use of a helmet PET device for a head, an X-ray CT device, and Kinect (produced by Microsoft Corporation) as the measurement devices Aa, Ab, and Ac, respectively. As the physical object, a phantom which simulated the shape of a human head was used, and a cylindrical portion and a rod portion each of which contained a radionuclide were embedded inside the phantom. The radioactivity of the cylindrical portion was 0.42 [MBq], and the radioactivity of the rod portion was 0.48 [MBq]. Note that either the cylindrical portion or the rod portion may be embedded.

Kinect was disposed in front of the helmet PET device, and the motion of the phantom was measured.

The phantom was caused to make two motions (periodic motion and free motion). In the periodic motion, the phantom was placed on a motorized stage, and was periodically rotated about the axis of the phantom. Specifically, the operation of rotating the phantom 30 degrees at a constant speed, and then returning the phantom to the original position at a constant speed was repeatedly carried out. In the free motion, the phantom was held in hands, and was caused to make a rotational and translational motion.

Each of the measurements was carried out for 30 minutes. Note that in each of the periodic motion and the free motion, the phantom was not moved for the first 60 seconds to acquire data for calibration parameter extraction. In addition, a measurement with the phantom being at rest was carried out for 30 minutes. A CT image was captured separately.

Figure 7:
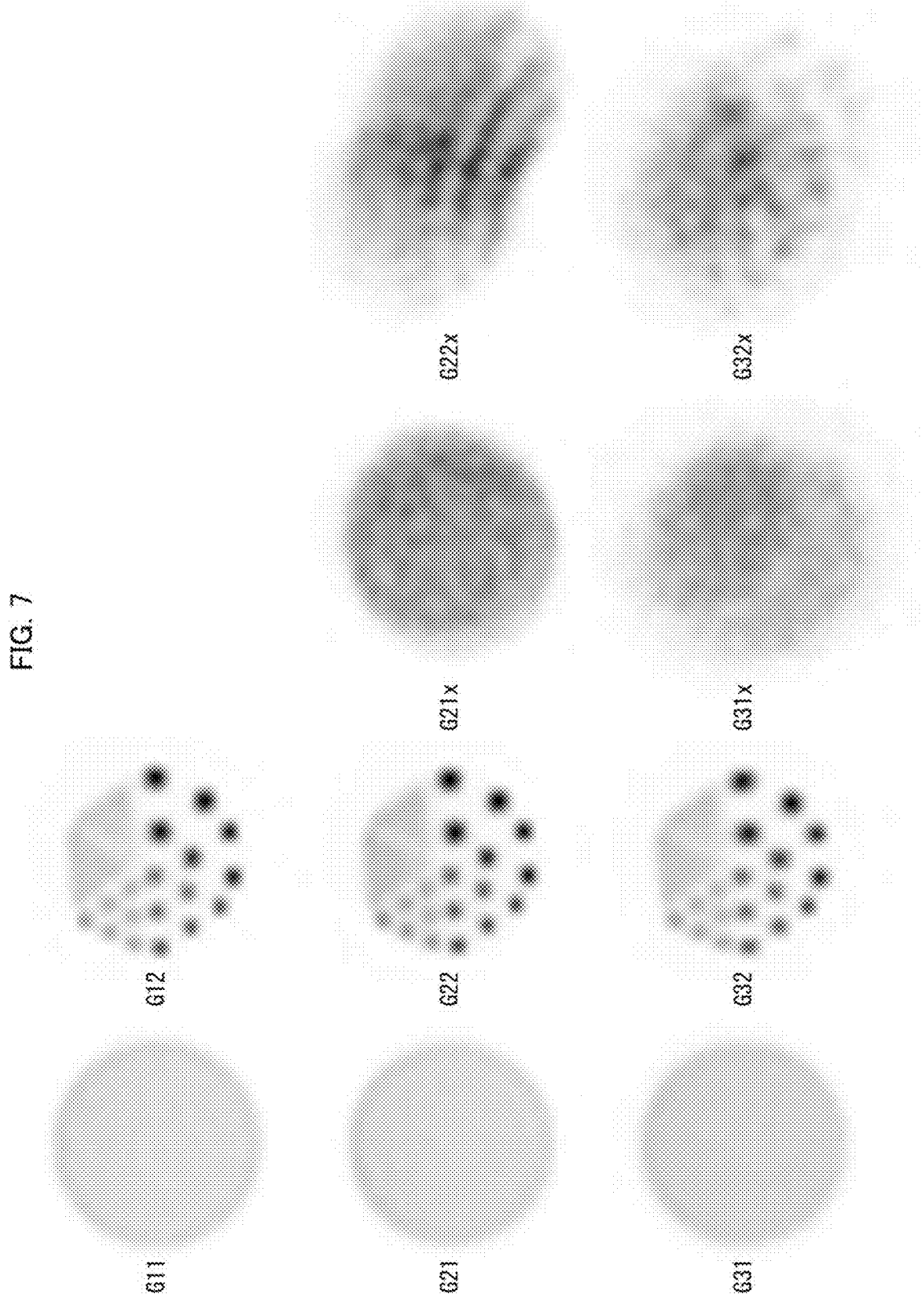
FIG. 7 illustrates images representing PET images obtained by an experiment.

FIG. 7 illustrates images representing PET images obtained by an experiment.

Image G11 and G12 are PET images of the phantom which is at rest and in which embedded are the cylindrical structure and the rod structures, respectively, and body motion corrections have not been made thereto (because of the images of the phantom at rest, a body motion correction is not required).

Images G21 and G22 are PET images of the phantom which is in periodic motion and in which embedded are the cylindrical structure and the rod structures, respectively, and body motion corrections have been made thereto. Images G21x and G22x correspond to the images G21 and G22, respectively, but differ from the images G21 and G22 in that body motion corrections have not been made thereto.

Images G31 and G32 are PET images of the phantom which is in periodic motion and in which embedded are the cylindrical structure and the rod structures, respectively, and body motion corrections have been made thereto. Images G31x and G32x correspond to the images G31 and G32, but differ from the images G31 and G32 in that body motion corrections have not been made thereto.

As is clear from the comparison between the images G21x and G22x and the images G11 and G12 of FIG. 7, not making body motion corrections in a case of the periodic motion caused blurs in the images. In particular, as illustrated in the Image G22x, the rod portions away from the rotation center (the axis of the phantom) were significantly blurred. As illustrated in the images G31x and G32x of FIG. 6, not making body motion corrections in a case of the free motion caused blurs in the entire images.

In contrast, as is clear from the comparison between the images G21, G22, G31, and G32 and the images G11 and G12, as a result of making body motion corrections, the images were precisely corrected whether in a case of the periodic motion or in a case of the free motion, and images equivalent to the images G11 and G12 of the phantom which is at rest were successfully obtained.

Invention Understood from Embodiment and Variation Above

The following is the invention understood from the Embodiment and Variation above.

(1) An information processing method in accordance with a first embodiment of the present invention includes the steps of: acquiring first 3D data (Da, PET list-mode data Da0) in which a distribution of radiation rays emitted from an inside of a physical object (subject P) is represented in first three-dimensional coordinates (Ca); acquiring second 3D data (Db, initial μ map Db0) in which the inside and an outer shape of the physical object are represented in second three-dimensional coordinates (Cb); acquiring third 3D data (Dc, dynamic range image Dc0) in which at least a part of the outer shape of the physical object is represented in third three-dimensional coordinates (Cc); and deriving a relationship (R) between the first three-dimensional coordinates and the third three-dimensional coordinates, based on the first 3D data, the second 3D data, and the third 3D data.

According to the first embodiment of the present invention, it is possible to easily derive a relationship between the first three-dimensional coordinates associated with the distribution of radiation rays emitted from the inside of the physical object and the third three-dimensional coordinates associated with the outer shape of the physical object, with use of the second 3D data in which the inside and the outer shape of the physical object are represented in the second three-dimensional coordinates.

(2) An information processing method in accordance with a second embodiment of the present invention, in which in the first embodiment, the step of deriving the relationship includes the sub-steps of: deriving a first relationship (Ra) between the first three-dimensional coordinates and the second three-dimensional coordinates, based on the first 3D data and the second 3D data; and deriving the relationship between the first three-dimensional coordinates and the third three-dimensional coordinates, based on the first relationship, the second 3D data, and the third 3D data.

According to the second embodiment of the present invention, it is possible to easily derive the relationship between the first and third three-dimensional coordinates, with use of the first relationship representing the relationship between the first and second three-dimensional coordinates and the second and third 3D data.

(3) An information processing method in accordance with a third embodiment of the present invention, in which in the second embodiment, a position relationship between the first three-dimensional coordinates and the second three-dimensional coordinates is derived as the first relationship by subjecting a first: inside image (Ia), represented by the first 3D data, of the physical object and a second inside image (Ib), represented by the second 3D data, of the physical object to a relative shift of position until the first inside image and the second inside image correspond to each other.

According to the third embodiment of the present invention, it is possible to easily derive the relationship between the first and second three-dimensional coordinates, with use of the first inside image represented by the first 3D data and the second inside image represented by the second 3D data.

(4) An information processing method in accordance with a fourth embodiment of the present invention, in which in the second or third embodiment, the sub-step of deriving the relationship includes the steps of: generating, based on the first relationship and the second 3D data, fourth 3D data ($\mu$ map Db1) in which the outer shape of the physical object is represented in the first three-dimensional coordinates (step ST42); and deriving, as the relationship, a position relationship between the first three-dimensional coordinates and the third three-dimensional coordinates by subjecting a first outer shape image (Hb), represented by the fourth 3D data, of the physical object and a second outer shape image (Hc), represented by the third 3D data, of the physical object to a relative shift of position until the first outer shape image and the second outer shape image correspond to each other (step ST53).

According to the fourth embodiment of the present invention, it is possible to easily derive the relationship between the first and third three-dimensional coordinates, with use of the first outer shape image represented by the fourth 3D data generated based on the first relationship and the second 3D data and the second outer shape image represented by the second 3D data.

(5) An information processing method in accordance with a fifth embodiment of the present invention, in which in the second or third embodiment, the sub-step of deriving the relationship includes the steps of: deriving, as a second relationship, a position relationship between the second three-dimensional coordinates and the third three-dimensional coordinates by subjecting a third outer shape image (Hb0), represented by the second 3D data (Db0), of the physical object and a second outer shape image (Hc), represented by the third 3D data (Dc0), of the physical object to a relative shift of position until the third outer shape image and the second outer shape image correspond to each other (step ST531); and deriving, based on the first relationship and the second relationship, the relationship between the first three-dimensional coordinates and the third three-dimensional coordinates (step ST54).

According to the fifth embodiment of the present invention, it is possible to easily derive the relationship between the first and third three-dimensional coordinates, with use of the third outer shape image represented by the second 3D data and the second outer shape image represented by the third 3D data.

(6) An information processing method in accordance with a sixth embodiment of the present invention, in which in any one of the first to fifth embodiments, the first 3D data is time-series 3D data which contains information on a temporal change in the distribution of the radiation rays, the temporal change being in accordance with a motion of the physical object, the third 3D data is time-series 3D data which contains information on a temporal change in a position of the outer shape of the physical object, the temporal change being in accordance with the motion of the physical object, the information processing method further includes the steps of: extracting, from the first 3D data, fifth 3D data on the physical object which is substantially at rest; and extracting, from the third 3D data, sixth 3D data (PET list-mode data Da0) which temporally corresponds to the fifth 3D data, and the step of deriving the relationship includes deriving the relationship, based on the fifth 3D data, the second 3D data, and the sixth 3D data.

According to the sixth embodiment of the present invention, it is possible to derive the relationship between the first and third three-dimensional coordinates, with use of the first and third time-series 3D data.

(7) An information processing method in accordance with a seventh embodiment of the present invention, further includes, in the sixth embodiment, the steps of: deriving a motion of the physical object on the first three-dimensional coordinates, based on the third 3D data and the relationship; and constructing an image of the inside of the physical object by correcting the first 3D data, based on the motion of the physical object on the first three-dimensional coordinates.

According to the seventh embodiment of the present invention, it is possible to correct the first 3D data with use of the relationship between the first and third three-dimensional coordinates, which are derived with use of the second 3D data (8) An information processing method in accordance with an eighth embodiment of the present invention, in which in any one of the first to seventh embodiments, the radiation rays are annihilation radiation, the first 3D data is 3D data based on data on annihilation radiation detected via first measurement equipment (Ma) for detecting annihilation radiation emitted from the inside of the physical object, and the first three-dimensional coordinates are three-dimensional coordinates given with the first measurement equipment used as a reference.

According to the eighth embodiment of the present invention, the first 3D data can be generated via the first measurement equipment (e.g. PET device) for detecting annihilation radiation emitted from the physical object.

(9) An information processing method in accordance with a ninth embodiment of the present invention, in which in any one of the first to eighth embodiments, the second 3D data is 3D data based on data on radiation rays, electromagnetic waves, or ultrasonic waves measured via second measurement equipment (Mb), the second measurement equipment including an irradiator for applying radiation rays, electromagnetic waves, or ultrasonic waves to the physical object and a detector for detecting the radiation rays, the electromagnetic waves, or the ultrasonic waves having passed through the inside of the physical object, and the second three-dimensional coordinates are three-dimensional coordinates given with the second measurement equipment used as a reference.

According to the ninth embodiment of the present invention, the second 3D data can be generated via the second measurement equipment (e.g. an X-ray CT device or an MRI device) for detecting radiation rays, electromagnetic waves, or ultrasonic waves, the radiation rays, the electromagnetic waves, or the ultrasonic waves having passed through the physical object.

(10) An information processing method in accordance with a tenth embodiment of the present invention, in which in any one of the first to ninth embodiments, the third 3D data is 3D data based on data on radiation rays, electromagnetic waves, or ultrasonic waves measured via third measurement equipment (Mc), the third measurement equipment including an irradiator for applying electromagnetic waves or ultrasonic waves to the physical object and a detector for detecting the electromagnetic waves or the ultrasonic waves having been reflected by the physical object, the third three-dimensional coordinates are three-dimensional coordinates given with the third measurement equipment used as a reference.

According to the tenth embodiment of the present invention, the third 3D data can be generated via the third measurement equipment (e.g. an optical measuring device) for detecting the electromagnetic waves or the ultrasonic waves having been reflected by the physical object.

(11) An information processing device in accordance with an eleventh embodiment of the present invention includes a memory and a processor, the processor carrying out the steps of: acquiring first 3D data in which a distribution of radiation rays emitted from an inside of a physical object is represented in first three-dimensional coordinates; acquiring second 3D data in which the inside and an outer shape of the physical object are represented in second three-dimensional coordinates; acquiring third 3D data in which at least a part of the outer shape of the physical object is represented in third three-dimensional coordinates; and deriving a relationship between the first three-dimensional coordinates and the third three-dimensional coordinates, based on the first 3D data, the second 3D data, and the third 3D data.

According to the eleventh embodiment of the present invention, it is possible to easily derive the relationship between the first three-dimensional coordinates associated with the distribution of radiation rays emitted from the inside of the physical object and the third three-dimensional coordinates associated with the outer shape of the physical object, with use of the second 3D data in which the inside and the outer shape of the physical object are represented in the second three-dimensional coordinates.

(12) An information processing program in accordance with a twelfth embodiment of the present invention causes a computer to function as the information processing device described in the eleventh embodiment, the program causing the processor to carry out each of the steps.

According to the twelfth embodiment of the present invention, it is possible to easily derive the relationship between the first three-dimensional coordinates associated with the distribution of radiation rays emitted from the inside of the physical object and the third three-dimensional coordinates associated with the outer shape of the physical object, with use of the second 3D data in which the inside and the outer shape of the physical object are represented in the second three-dimensional coordinates.

(13) A computer-readable recording medium in accordance with a thirteenth embodiment of the present invention has recorded thereon the information processing program described in the twelfth embodiment.

According to the thirteenth embodiment of the present invention, it is possible to easily derive the relationship between the first three-dimensional coordinates associated with the distribution of radiation rays emitted from the inside of the physical object and the third three-dimensional coordinates associated with the outer shape of the physical object, with use of the second 3D data in which the inside and the outer shape of the physical object are represented in the second three-dimensional coordinates.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10: Information processing device
11: Processor
12: Primary memory
13: Secondary memory
14: Input-output interface
15: Bus
Aa, Ab, Ac: Measurement device
Ma, Mb, Mc: Measurement equipment
Ca, Cb, Cc: Coordinate
Da, Db, Dc: 3D data
1a, 1b: Inside image
Hb, Hc: Outer shape image
Pca: Coordinate conversion parameter

The invention claimed is:

1. An information processing method comprising the steps of:
   acquiring first 3D data in which a distribution of radiation rays emitted from an inside of a physical object is represented in first three-dimensional coordinates;
   acquiring second 3D data in which the inside and an outer shape of the physical object are represented in second three-dimensional coordinates;
   acquiring third 3D data in which at least a part of the outer shape of the physical object is represented in third three-dimensional coordinates; and
   deriving a relationship between the first three-dimensional coordinates and the third three-dimensional coordinates, based on the first 3D data, the second 3D data, and the third 3D data.

2. The information processing method according to claim 1, wherein
   the step of deriving the relationship includes the sub-steps of:
   deriving a first relationship between the first three-dimensional coordinates and the second three-dimensional coordinates, based on the first 3D data and the second 3D data; and
   deriving the relationship between the first three-dimensional coordinates and the third three-dimensional coordinates, based on the first relationship, the second 3D data, and the third 3D data.

3. The information processing method according to claim 2, wherein
   the step of deriving the first relationship includes
   deriving, as the first relationship, a position relationship between the first three-dimensional coordinates and the second three-dimensional coordinates by subjecting a first inside image, represented by the first 3D data, of the physical object and a second inside image, represented by the second 3D data, of the physical object to a relative shift of position until the first inside image and the second inside image correspond to each other.

4. The information processing method according to claim 2, wherein
   the sub-step of deriving the relationship includes the steps of:
   generating, based on the first relationship and the second 3D data, fourth 3D data in which the outer shape of the physical object is represented in the first three-dimensional coordinates; and
   deriving, as the relationship, a position relationship between the first three-dimensional coordinates and the third three-dimensional coordinates by subjecting a first outer shape image, represented by the fourth 3D data, of the physical object and a second outer shape image, represented by the third 3D data, of the physical object to a relative shift of position until the first outer shape image and the second outer shape image correspond to each other.

5. The information processing method according to claim 2, wherein
the sub-step of deriving the relationship includes the steps of:
deriving, as a second relationship, a position relationship between the second three-dimensional coordinates and the third three-dimensional coordinates by subjecting a third outer shape image, represented by the second 3D data, of the physical object and a second outer shape image, represented by the third 3D data, of the physical object to a relative shift of position until the third outer shape image and the second outer shape image correspond to each other; and
deriving, based on the first relationship and the second relationship, the relationship between the first three-dimensional coordinates and the third three-dimensional coordinates.

6. The information processing method according to claim 1, wherein
the first 3D data is time-series 3D data which contains information on a temporal change in the distribution of the radiation rays, the temporal change being in accordance with a motion of the physical object,
the third 3D data is time-series 3D data which contains information on a temporal change in a position of the outer shape of the physical object, the temporal change being in accordance with the motion of the physical object,
the information processing method further comprises the steps of:
extracting, from the first 3D data, fifth 3D data on the physical object which is substantially at rest; and
extracting, from the third 3D data, sixth 3D data which temporally corresponds to the fifth 3D data, and
the step of deriving the relationship includes
deriving the relationship, based on the fifth 3D data, the second 3D data, and the sixth 3D data.

7. The information processing method according to claim 6, further comprising the steps of:
deriving a motion of the physical object on the first three-dimensional coordinates, based on the third 3D data and the relationship; and
constructing an image of the inside of the physical object by correcting the first 3D data, based on the motion of the physical object on the first three-dimensional coordinates.

8. The information processing method according to claim 1, wherein
the radiation rays are annihilation radiation,
the first 3D data is 3D data based on data on annihilation radiation detected via first measurement equipment for detecting annihilation radiation emitted from the inside of the physical object, and the first three-dimensional coordinates are three-dimensional coordinates given with the first measurement equipment used as a reference.

9. The information processing method according to claim 1, wherein
the second 3D data is 3D data based on data on radiation rays, electromagnetic waves, or ultrasonic waves measured via second measurement equipment, the second measurement equipment including an irradiator for applying radiation rays, electromagnetic waves, or ultrasonic waves to the physical object and a detector for detecting the radiation rays, the electromagnetic waves, or the ultrasonic waves having passed through the inside of the physical object, and
the second three-dimensional coordinates are three-dimensional coordinates given with the second measurement equipment used as a reference.

10. The information processing method according to claim 1, wherein
the third 3D data is 3D data based on data on electromagnetic waves or ultrasonic waves measured via third measurement equipment, the third measurement equipment including an irradiator for applying electromagnetic waves or ultrasonic waves to the physical object and a detector for detecting the electromagnetic waves or the ultrasonic waves having been reflected by the physical object,
the third three-dimensional coordinates are three-dimensional coordinates given with the third measurement equipment used as a reference.

11. An information processing device comprising
a memory and a processor,
the processor carrying out the steps of:
acquiring first 3D data in which a distribution of radiation rays emitted from an inside of a physical object is represented in first three-dimensional coordinates;
acquiring second 3D data in which the inside and an outer shape of the physical object are represented in second three-dimensional coordinates;
acquiring third 3D data in which at least a part of the outer shape of the physical object is represented in third three-dimensional coordinates; and
deriving a relationship between the first three-dimensional coordinates and the third three-dimensional coordinates, based on the first 3D data, the second 3D data, and the third 3D data.

12. A non-transitory computer-readable recording medium having recorded thereon an information processing program for causing a computer to function as the information processing device according to claim 11, the information processing program causing the processor to carry out each of the steps.

* * * * *